United States Patent [19]

Stoltzmann

[11] Patent Number: 4,542,954
[45] Date of Patent: Sep. 24, 1985

[54] WIDE ANGLE LENS FOR THE INFRARED DEDICATORY CLAUSE

[75] Inventor: David E. Stoltzmann, Bayport, Minn.

[73] Assignee: The United States of America as represented by the Secretary of the Army, Washington, D.C.

[21] Appl. No.: 550,698

[22] Filed: Nov. 10, 1983

[51] Int. Cl.[4] .................. G02B 13/14; G02B 9/62
[52] U.S. Cl. ............................. 350/1.3; 350/464
[58] Field of Search ............ 350/1.3, 1, 464, 412, 350/1.2

[56] References Cited

U.S. PATENT DOCUMENTS 2,872,845  2/1959  Baker .......................... 350/1.3
4,469,396  9/1984  Neil ............................ 350/1.3

Primary Examiner—John K. Corbin
Assistant Examiner—Bruce S. Shapiro
Attorney, Agent, or Firm—John H. Raubitschek; Werten F. W. Bellamy; Robert C. Sims

[57] ABSTRACT

This rotationally symmetric optical sensor consists of six lens elements made selectively of the alkali halide materials KBr, C I, and KI. It has a wide field-of-view coverage of 60 degrees and operates in the middle infrared through the far infrared bands and extends well into the extreme infrared band. The combination of optical materials selected to be used effectively corrects the chromatic and monochromatic aberrations of the sensor.

1 Claim, 4 Drawing Figures

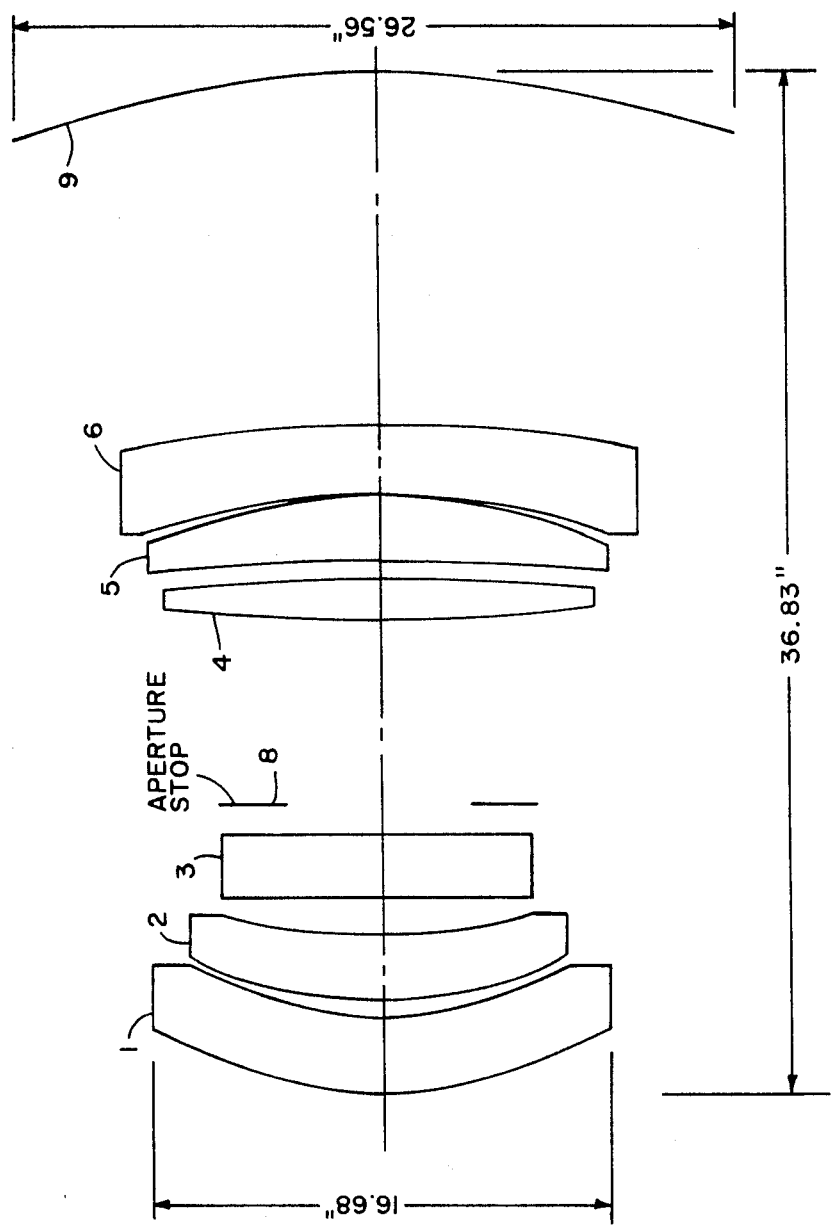

WIDE ANGLE LENS FOR THE INFRARED DEDICATORY CLAUSE

DEDICATORY CLAUSE

The invention described herein was made in the course of or under a contract or subcontract thereunder with the Government and may be manufactured, used, and licensed by or for the Government for governmental purposes without the payment to me of any royalties thereon.

BRIEF DESCRIPTION OF THE DRAWINGS

FIG. 1 is a diagrammatic showing of the present invention.

DESCRIPTION OF THE BEST MODE AND PREFERRED EMBODIMENT

FIG. 1 shows a rotationally symmetric optical design which consists of six elements 1-6 made of the alkali halide materials KBr, CsI, and KI. It has a wide field-of-view coverage of 60 degrees and operates in the middle infrared through the far infrared bands (λ-band 1 and λ-band 2) and extends well into the extreme infrared band (λ-band 3).

Figure 2A:
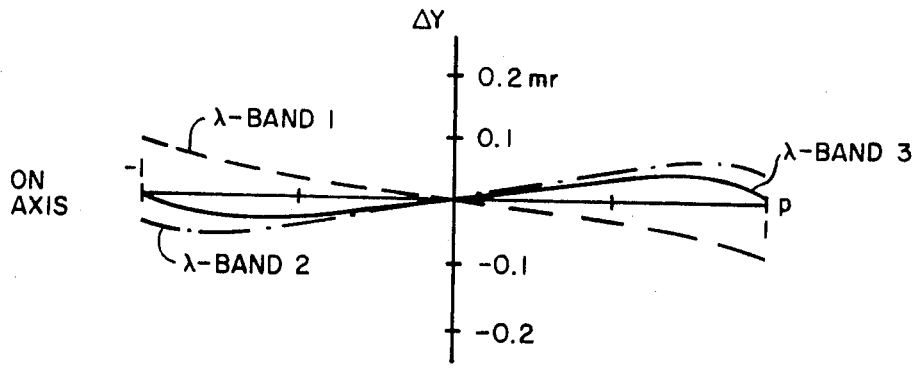
FIG. 2A through 2C show the systems meridional ray fan plots for on axis and 22.3 degrees and 30.4 degrees off axis inputs.
Figure 2B:
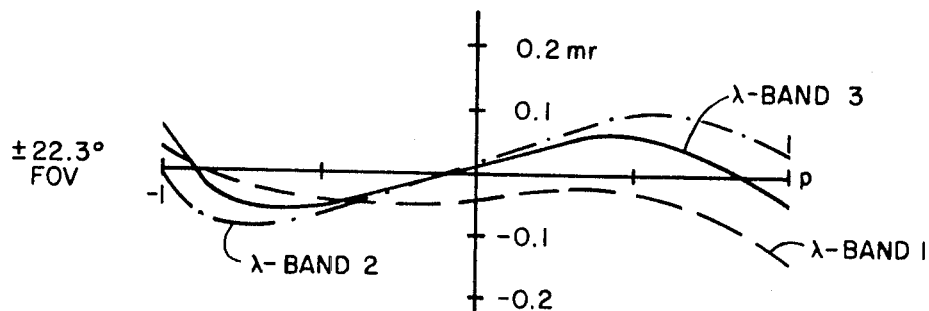
Figure 2C:
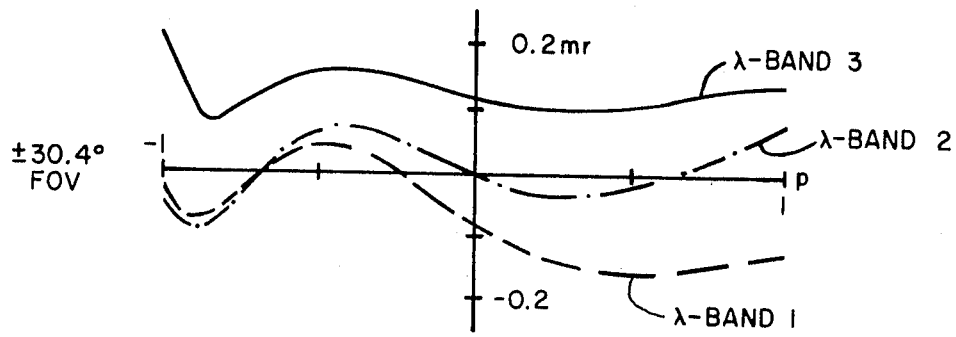

The objective of this optical design is to function as an optical sensor which will acquire, discriminate, and track a long-wavelength infrared target. The very limited choice of optical materials which transmit at long wavelengths allowed only the combination of optical materials shown in FIG. 1 to be used to effectively correct the chromatic aberrations of the lens. The excellent chromatic and mono-chromatic correction of the lens is shown in FIGS. 2A-2C.

Lens prescriptions are given in the tables below for a single focal plane configuration. The prescriptions for a multiple focal plane "sandwich" detector configuration will only vary slightly from that given in the tables. This lens system is the product of many years of investigation into wide angle infrared optical systems.

FIG. 1 shows six all refractive lenses for the system. An aperture stop 8 is provided so that a + or −30.36 degrees off the center axis input can be fielded without vignetting. The F-number is equal to 3. The focal plane 9 is in a curved configuration; therefore, the lens prescriptions have been adjusted for a curve focus. The focal plane 9 shown in FIG. 1 is for a side-by-side configuration detector. The system, with small prescription changes, will also work with a sandwich detector configuration. The sandwich detector would be a three-dimensional detector in which the detecting elements are planes stacked on top of each other, so as to have slightly different back focal lengths with respect to the rear lens surface.

Element 1 in FIG. 1 is a lens which is made up of potassium bromide. Elements 2, 3, 4 and 5 are all made up of cesium iodide. The last element 6 is made up of potassium iodide. The EFL is equal to 24 inches. All of the elements cooperate to act as one lens which focuses onto detector focal plane 9. The selection of the materials and their location was critical in the chromatic and mono-chromatic correction.

FIGS. 2A through 2C show the ray fan errors measured in milli radians (MR) as a function of the distance from the center of the lens. As can be seen the correction is below 0.2 MR for all of the meridional fans of interest. This is well within the exceptance of the detector system. These figures each represent plots of the aberrations of the whole lens system with the different figures representing different angles of the entry of the radiation into the refractive system. Each plot is derived by taking measurements at only one frequency band at a time (λ-bands 1-3).

Lens prescription tables for the basic lens data are given on the next page. In the Table, A and B represents the left and right hand surfaces (SURF) as seen in FIG. 1. The term RD represents the raduis of these surfaces and CV is equal to the reciprocal of the radius. The term TH represents the distance traveled in order to get from one surface to the next surface in a left to right configuration as viewed in FIG. 1. Under MEDIUM is given the material in which this travel "TH" takes place. The travel is calculated along this center line as shown in FIG. 1.

The material properties of the substrates require that the lens elements 1-6 be fabricated by a process known as hot forging (U.S. Pat. No. 3,794,704, J. D. Strong, 1974). This process will improve the surface profiles on the substrates. U.S. Pat. No. 3,674,330, J. D. Strong, 1972 shows the use of an alkali halide doublet lens.

| ELEMENT # | SURF | CV | RD | TH | MEDIUM |
|---|---|---|---|---|---|
| 1 | A | 0.056996 | 17.545086 | 2.841697 | KBR |
|   | B | 0.075118 | 13.312300 | 1.291968 | AIR |
| 2 | A | 0.061130 | 16.358525 | 2.395441 | CSI |
|   | B | 0.038057 | 26.276313 | 0.955152 | AIR |
| 3 | A | 0.012845 | 77.852714 | 2.917873 | CSI |
|   | B | −0.006788 | −147.328009 | 0.943488 | AIR |
| 8 | 8 | 0. | 0. | 6.519242 | AIR |
| 4 | A | 0.012868 | 77.710706 | 1.750825 | CSI |
|   | B | −0.008292 | −120.597400 | 1.042032 | AIR |
| 5 | A | −0.007304 | −136.917190 | 2.487841 | CSI |
|   | B | −0.046428 | −21.538759 | 0.133560 | AIR |
| 6 | A | −0.037506 | −26.662185 | 2.464465 | KI |
|   | B | −0.014585 | −68.563895 | 12.441388 | AIR |
| 9 | 9 | −0.027314 | −36.610620 | 0. | AIR |

I claim:

1. An improvement in a wide angle lens system for use in the infrared frequency band in which said system has inherent chromatic and monochromatic aberrations without corrections: the improvement comprising first, second, third, fourth, fifth and sixth lenses arranged in that order from left to right; the first lens is made of potassium bromide and has a left and right side radius of 17.545086 and 13.312300 inches; the second, third, fourth and fifth lenses are each made of cesium iodide and have left and right side pairs of radius of (16.358525, 26.276313), (77.852714, −147.328009), (77.710706, −120.597400), (−136.917190, −21.538799) inches respectively; the sixth lens is made of potassium iodide and has a left and right side radius of −26.662185 and −68.563895 inches; the lenses are constructed and located relative to each other such that center lines of each of the lenses are lined up and the distances traveled in inches along the center line to get from one side of a lens to a next side of a lens starting with the left side of said first lens on to the right side of said sixth lens are 2.841697, 1.291968, 2.395441, 0.955152, 2.917873, 7.462730, 1.750825, 1.042032, 2.487841, 0.133560, and 2.464465; and the total effect will be to focus on a surface with the inherent chromatic and monochromatic aberrations effectively corrected from the middle infrared band through the far infrared band.

* * * * *